(12) United States Patent
Bingham et al.

(10) Patent No.: US 7,153,489 B2
(45) Date of Patent: *Dec. 26, 2006

(54) METHOD OF PRODUCING HYDROGEN

(75) Inventors: Dennis N. Bingham, Idaho Falls, ID (US); Kerry M. Klingler, Idaho Falls, ID (US); Bruce M. Wilding, Idaho Falls, ID (US); William T. Zollinger, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 357 days.

This patent is subject to a terminal disclaimer.

(21) Appl. No.: 10/778,788

(22) Filed: Feb. 13, 2004

(65) Prior Publication Data

US 2005/0180915 A1 Aug. 18, 2005

(51) Int. Cl.
*C01B 3/02* (2006.01)
*C01B 3/24* (2006.01)
*C01B 6/00* (2006.01)
*C01B 6/04* (2006.01)

(52) U.S. Cl. ............... 423/648.1; 62/607; 423/645; 423/646; 423/650

(58) Field of Classification Search ............... 423/645, 423/646, 648.1, 650, 651; 62/607
See application file for complete search history.

(56) References Cited

U.S. PATENT DOCUMENTS

| | | | |
|---|---|---|---|
| 3,504,494 A | 4/1970 | Winsche | |
| 3,943,719 A | 3/1976 | Terry et al. | |
| 4,593,534 A | 6/1986 | Bloomfield | |
| 4,671,080 A | 6/1987 | Gross | |
| 5,161,382 A | 11/1992 | Missimer | |
| 5,363,655 A | 11/1994 | Kikkawa et al. | |
| 5,615,561 A | 4/1997 | Houshmand et al. | |
| 5,997,821 A | 12/1999 | Joshi | |
| 6,221,310 B1* | 4/2001 | Checketts et al. | 266/48 |
| 6,235,235 B1* | 5/2001 | Checketts | 266/153 |
| 6,412,302 B1 | 7/2002 | Foglietta | |
| 6,471,935 B1 | 10/2002 | Jensen et al. | |
| 6,572,836 B1* | 6/2003 | Schulz et al. | 423/648.1 |
| 6,581,409 B1 | 6/2003 | Wilding et al. | |
| 6,994,839 B1* | 2/2006 | Reichman et al. | 423/648.1 |
| 7,078,012 B1* | 7/2006 | Bingham et al. | 423/659 |
| 2004/0156777 A1* | 8/2004 | Reichman et al. | 423/648.1 |
| 2005/0106097 A1* | 5/2005 | Graham et al. | 423/648.1 |
| 2005/0163705 A1* | 7/2005 | Reichman et al. | 423/648.1 |

* cited by examiner

*Primary Examiner*—Wayne A. Langel
(74) *Attorney, Agent, or Firm*—Wells St. John P.S.

(57) ABSTRACT

A method of producing hydrogen is disclosed and which includes providing a first composition; providing a second composition; reacting the first and second compositions together to produce a chemical hydride; providing a liquid and reacting the chemical hydride with the liquid in a manner to produce a high pressure hydrogen gas and a byproduct which includes the first composition; and reusing the first composition formed as a byproduct in a subsequent chemical reaction to form additional chemical hydride.

21 Claims, 1 Drawing Sheet

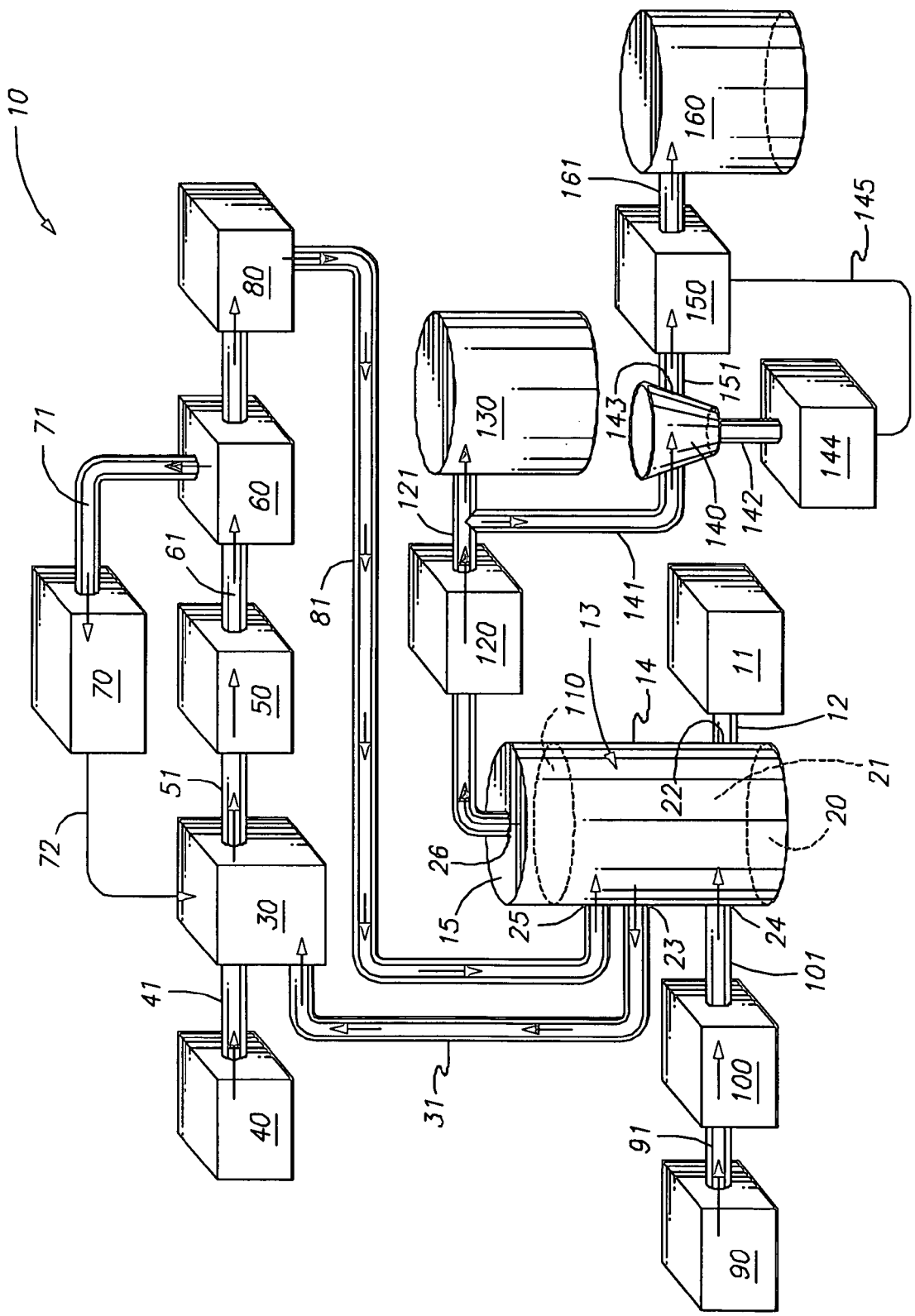

METHOD OF PRODUCING HYDROGEN

GOVERNMENT RIGHTS

The United States Government has certain rights in the following invention pursuant to Contract No. DE-AC07-99ID13727 between the U.S. Department of Energy and Bechtel BWXT Idaho, LLC.

TECHNICAL FIELD

The present invention relates to a method of producing hydrogen, and more specifically to a method which produces a chemical hydride, which, when reacted with a liquid, produces hydrogen gas, and a byproduct, which is then later reused, or recycled to form an additional chemical hydride which is used in later reactions.

BACKGROUND OF THE INVENTION

The prior art is replete with numerous examples of methods and devices, of various means, for storing and generating hydrogen, and later using that same hydrogen as a fuel in various electrochemical devices such as fuel cells or which further can be consumed in internal combustion engines of various overland vehicles.

As a general matter, current methods of producing hydrogen have been viewed by most researchers as being expensive and very energy intensive. It has long been known that hydrogen can be produced from a chemical reaction of an alkali metal with water and various arrangements such as what is shown in U.S. Pat. No. 5,728,864 have been devised to enclose a reactive material, such as an alkali metal, or metal hydride, that which, upon exposure to water, produces hydrogen as a product of that reaction.

While the advantages of using a fuel such as hydrogen to replace fossil fuel as a primary energy source are many, no single approach has emerged which will provide a convenient means whereby hydrogen can be economically produced in a form, whether gaseous, or liquified, which makes it useful in the applications noted above. Still further, the methods currently disclosed in the prior art of producing useful chemical hydrides for the methodology discussed above, and which could potentially be used to implement, at least in part, a hydrogen infrastructure has still remained elusive.

Therefore a method of producing hydrogen which addresses these and other perceived shortcomings in the prior art teachings and practices is the subject matter of the present application.

SUMMARY OF THE INVENTION

One aspect of the present invention is to provide a method of producing hydrogen which includes providing a first composition; providing a second composition; reacting the first and second compositions together to produce a chemical hydride; providing a liquid and reacting the chemical hydride with the liquid in a manner to produce a high pressure hydrogen gas, and a byproduct which includes the first composition; and reusing the first composition formed as a byproduct in a subsequent chemical reaction to form additional chemical hydride.

Another aspect of the present invention is to provide a method of producing hydrogen which includes providing a chemical reactor; selecting a first composition having chemical bonds and which is capable of forming a chemical hydride and supplying the first composition to the chemical reactor; selecting a second composition and which provides a source of hydrogen and supplying the second composition to the chemical reactor; reacting the first and second compositions in the chemical reactor to produce a chemical hydride; providing a container which encloses a liquid under pressure and supplying the chemical hydride to the container; reacting the chemical hydride with the liquid which is under pressure in the container to produce high pressure hydrogen gas and byproducts which include the first composition; and supplying the first composition formed as a byproduct to the chemical reactor.

Still another aspect of the present invention relates to a method of producing hydrogen which includes providing a supply of sodium hydroxide; providing a source of methane; providing a chemical reactor and supplying the sodium hydroxide and methane to the chemical reactor, and chemically reacting the sodium hydroxide and the methane to produce sodium hydride and other byproducts; providing a burner and supplying, at least in part, the byproducts produced as a result of the chemical reaction of the sodium hydroxide and the methane, to the burner, and wherein the burner when supplied with the byproducts produces heat energy which is supplied to the chemical reactor to increase the temperature of the sodium hydroxide and the methane; providing a container defining a cavity; providing a supply of water to the cavity of the container; increasing the pressure of the water within the cavity of the container to a high pressure; supplying the sodium hydride to the cavity of the container and reacting the sodium hydride with the water to produce high pressure hydrogen gas, and a byproduct which includes sodium hydroxide; withdrawing the high pressure hydrogen gas from the cavity; and supplying the sodium hydroxide produced as a byproduct of the chemical reaction of the sodium hydride and the water to the chemical reactor for use in the further production of additional sodium hydride.

These and other aspects of the present invention will be discussed in greater detail hereinafter.

BRIEF DESCRIPTION OF THE DRAWINGS

Preferred embodiments of the invention are described below with reference to the following accompanying drawing.

The drawing is a greatly simplified schematic illustration of an arrangement for practicing the present method.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

An arrangement which is useful in practicing the methodology of the present invention is designated by the numeral 10 and is seen in the drawing. As illustrated therein, the methodology includes as a first step providing a first composition hereinafter referred to as a supply of sodium hydroxide 11. The supply of sodium hydroxide 11 is coupled in fluid flowing relation relative to a passageway or conduit which is generally indicated by the numeral 12. This conduit or passageway couples the first composition or the source of sodium hydroxide 11 in fluid flowing relation relative to a container which is indicated by the numeral 13. The container 13 is defined by a sidewall 14, and further includes a top surface 15, and a bottom surface 20. Both of the top and bottom surfaces are attached to the sidewall 12 and further define an internal cavity 21. First, second, third and fourth passageways or apertures 22, 23, 24 and 25 are formed through the sidewall 14 and couple the internal cavity 21 in fluid flowing relation relative to other assemblies which will be discussed hereinafter. Still further, an aperture or passageway 26 is formed in the top surface 15. The passageway or conduit 12 is received in or through the first aperture 22.

The supply of sodium hydroxide, which constitutes a first composition 11 is received in the cavity 21 which is defined by the container 13. As will be discussed in greater detail hereinafter, the first composition 11 is chemically reacted with a second composition, as will be described below, to produce a chemical hydride which, when subsequently reacted with a liquid, produces hydrogen gas, and byproducts which include the first composition 11. Thus, by means of the present methodology, the first composition can be later reused or recycled to form additional chemical hydride which is used in later chemical reactions as will become more apparent from the discussion which is found in the paragraphs below. The supply of sodium hydroxide 11, and which is received within the internal cavity 21 of the container 13, or which further is produced as a byproduct of the chemical reaction discussed, above, passes from the internal cavity 21 of the container 13 through the second aperture 23, and is received within a chemical reactor which is generally indicated by the numeral 30. The sodium hydroxide 11 travels to the chemical reactor 30 by way of a conduit or other passageway 31. As will be discussed below, the sodium hydroxide provides a source of sodium to the reaction. It should be recognized that sodium may be added to the system at a number of different locations in order to meet the needs of the chemical reactions. These locations include directly at the chemical reactor, or further downstream in the process which will be discussed below.

The methodology of the present invention further includes the step of providing a source of a second composition 40 which provides a source of hydrogen, and which may be reacted with a first composition 11 to produce a chemical hydride as will be described below. The second composition 40 may include various hydrocarbons such as methane, which may suitably react with the first composition in order to release hydrogen which is utilized to form a resulting chemical hydride. The second composition or source of methane 40 is coupled in fluid flowing relation with the chemical reactor 30, by way of a conduit or passageway 41. Therefore, the methodology of the present invention provides a step whereby the first composition 11, which may include sodium hydroxide, and the second composition 40 which may include methane are supplied to the chemical reactor 30, and chemically react together to produce a chemical hydride, such as sodium hydride and other byproducts. The byproducts produced by this chemical reaction of the first and second compositions 11 and 40 may include undesirable compositions such as carbon monoxide, and the like. Consequently, the methodology of the present invention further includes the step of providing a shift converter 50, and supplying the byproducts which may include carbon monoxide to the shift converter, and chemically converting the carbon monoxide to carbon dioxide within the shift converter. The shift converter 50 is coupled to the chemical reactor 30 by way of a conduit or passageway 51.

The methodology of the present invention further includes a step of providing a separator 60 which is coupled in fluid flowing relation relative to the shift converter 50 by way of a conduit or passageway 61. The separator 60 is operable to receive the resulting chemical hydride, and other byproducts produced by the reaction of the first composition 11, with the second composition 40, and provide a portion of the byproducts, which may include any remaining carbon monoxide and carbon dioxide produced as a result of the conversion of carbon monoxide to carbon dioxide which has occurred in the shift converter 50, to a burner 70. The burner is coupled to the separator 60 by way of a conduit 71. The byproducts, which may include carbon monoxide, carbon dioxide and some hydrogen are received in the burner where they are consumed by combustion and which produce heat energy. This heat energy forms a heat output which is generally indicated by the numeral 72. The heat output 72 is subsequently provided to the chemical reactor 30 to increase the temperature of the first and second compositions 11 and 40 which are chemically reacting within same in order to produce a source of chemical hydride 80, which may include sodium hydride, and various byproducts.

The source of the chemical hydride 80, which may include sodium hydride, is coupled in fluid flowing relation relative to the internal cavity 21 of the container 13 by way of a conduit or passageway 81. The source of the chemical hydride 80 passes into the internal cavity 21 by way of the fourth aperture or passageway 25. The methodology of the present invention further includes the step of providing a source of a liquid 90, such as water, and reacting the source of the chemical hydride 80 with the liquid 90 in a manner which produces a high pressure hydrogen gas, and a byproduct which includes the first composition 11. While the discussion above indicates that the source of chemical hydride is provided first, and then reacted with the water 90, it should be understood that this order is not important and these compositions could be supplied in reverse order, or together to achieve the benefits of the present methodology. In this regard, the source of the liquid, such as water 90, is supplied by way of conduit 91 to a charging pump and which is generally indicated by the numeral 100. The charging pump 100 is further coupled by way of a conduit or other passageway 101 to the container 13 where the liquid, such as water, passes into the internal cavity 21 by way of the third aperture or passageway formed in the sidewall 14. The charging pump is operable to supply the liquid, such as water, to the internal cavity and then maintain the liquid received within the cavity at a pressure of at least 150 PSI.

In the method of the present invention, and following the step of supplying the source of the chemical hydride 80, such as sodium hydride to the cavity 21 of the container 13 and mixing the source of liquid 90, such as water, with same, a chemical reaction results that produces high pressure hydrogen gas 110, and other byproducts including the first composition 11. As earlier discussed, the sodium hydroxide 11, which is generated as a result of this chemical reaction, may then be recycled or reused by exiting or passing from the container 13 and being returned by way of the conduit or passageway 31 to the chemical reactor 30 where it may subsequently be reacted with the second composition 40, which may include methane, to produce further chemical hydride such as sodium hydride 80. As a result of the liquid pressure provided within the container 13, as maintained by the charging pump 100, a high pressure hydrogen gas 110 is produced.

The methodology of the present invention further includes the step of providing the source of high pressure hydrogen gas 110 produced in the container 13 to a hydrogen dryer which is generally indicated by the numeral 120. This dryer could be any type of commercial dryer. The hydrogen dryer is utilized to remove any water, or other liquids which may be mixed with the high pressure hydrogen gas 110, thereby making it more useful for particular applications. In the application as shown, the dryer could be a configuration of sodium which would react with any remaining water to remove same from the high pressure hydrogen gas. If this option is utilized, a hydrogen dryer would not be required. As should be understood, this hydrogen dryer may not be necessary for certain applications because there are benefits to be derived from having, for example, gaseous water mixed with the resulting high pressure hydrogen gas. This mixture would be useful as a fuel which may be utilized in proton exchange membrane fuel cells and the like.

The methodology of the present invention further includes the step of withdrawing the high pressure hydrogen gas 110 from the cavity 21 of the container 13, and which has passed through the hydrogen dryer 120 and receiving it in a storage container 130, where it may be subsequently drawn off, at high pressure and supplied as a fuel for various end uses. The high pressure hydrogen gas 110 exits the hydrogen dryer 120, and is received in the storage container 130 by way of a conduit 121.

The method of the present invention further includes a step of providing an expansion engine 140 and coupling the expansion engine in fluid flowing relation relative to the cavity 21 of the container 13 by way of a conduit 141. The conduit 141 is coupled in fluid flowing relation relative to the conduit 121 as seen in the drawing. As earlier discussed, the previous step of pressurizing the liquid, such as water 90, within the container 13, and mixing the source of sodium hydride 80 with same, produces a high pressure hydrogen gas 110. As seen in the drawing, the high pressure gas 110 following treatment by the hydrogen dryer 120 is delivered to the expansion engine 140. Expansion engines are well known in the art and include internal turbines (not shown) and which, when exposed to the flow of the high pressure gas 110, produces a first mechanical output 142, and a second gas output 143 having a reduced pressure and temperature. The mechanical output 142 of the expansion engine is convened into various power or work outputs 144 which may include but are not limited to mechanical, electrical, hydraulic and others, and which are subsequently transmitted by way of a transmission pathway 144, or other force or work transmission means, to a refrigeration assembly which is generally indicated by the numeral 150. The refrigeration assembly is of conventional design and is coupled in fluid flowing relation relative to the gas output 143 of the expansion engine 140 by way of a fluid conduit or passageway 151. The expansion engine 140 is operable to generate, at least in part, the power or work output necessary to energize or actuate the refrigeration assembly 150. The gas output 143 of the expansion engine 140, once received by the refrigeration assembly 150 is further reduced in temperature thereby liquifying same. The liquified hydrogen gas 110 now moves from the refrigeration assembly on to a storage container 160 by way of a conduit or other passageway 161.

In the method 10 as described above, the step of pressurizing the liquid 90 includes pressurizing the liquid to a pressure which causes the resulting high pressure hydrogen gas 110 to have a pressure of at least 150 PSI. Still further, the step of supplying the high pressure hydrogen gas 110 to the expansion engine 140 comprises providing a gas output 143 having a reduced temperature of less than about 50° C. and a pressure greater than about 1 atmosphere or ambient. In the embodiment as shown in the drawing, and which is useful in practicing the method of the present invention 10, the expansion engine 140 may comprise a turbo-expander which is coupled in fluid receiving relation relative to the high pressure hydrogen gas 110. In this arrangement, the turbo-expander generates a power output which is transmitted by way of the transmission pathway 145 and which provides a preponderance of the power or work needed by the refrigeration assembly 150 to liquify the hydrogen gas 110. The expansion engine 140 in combination with the refrigeration assembly 150 are operable to reduce the temperature of the high pressure hydrogen gas 110 to at least about –200° F., and further reduce the pressure of the gas 110 to less than about 150 PSI.

OPERATION

The methodology of the present invention is believed to be readily apparent and is briefly summarized at this point.

A method of producing hydrogen of the present invention is best understood by a study of the drawing. The present methodology includes a step of providing a first composition 11; providing a second composition 40; reacting the first and second compositions 11 and 40 together to produce a chemical hydride 80; providing a liquid 90 and reacting the chemical hydride 80 with the liquid 90 in a manner to produce high pressure hydrogen gas 110, and a byproduct which includes the first composition 11; and reusing the first composition 11 formed as a byproduct in a subsequent chemical reaction to form additional chemical hydride 80.

In addition to the foregoing, the methodology further includes providing an expansion engine 140, and coupling the expansion engine in fluid flowing relation relative to the high pressure hydrogen gas 110, and wherein the expansion engine 140 produces a hydrogen gas output 143 having a reduced temperature and pressure and which further generates a power output 145; coupling the expansion engine 140 in fluid flowing relation relative to a refrigeration assembly 150, and wherein the hydrogen gas output 143 having the reduced temperature and pressure is provided to the refrigeration assembly; and energizing the refrigeration assembly, at least in part, by supplying the power output 145 generated by the expansion engine to the refrigeration assembly 150 to further reduce the temperature of the hydrogen gas output to liquefy the hydrogen gas.

In addition to the foregoing, the methodology of the present invention 10 further includes the steps of providing a chemical reactor 30; selecting a first composition 11 having chemical bonds, and which is capable of forming a chemical hydride 80, and supplying the first composition 11 to the chemical reactor 30; selecting a second composition 40 and which provides a source of hydrogen and supplying the second composition to the chemical reactor 30; reacting the first and second compositions 11 and 40 together in the chemical reactor to produce a chemical hydride 80; providing a container 13 which encloses a liquid 90 under pressure, and supplying the chemical hydride 80 to the container 13; reacting the chemical hydride 80 with the liquid 90 which is under pressure in the container 13 to produce high pressure hydrogen gas 110, and other byproducts which include the first composition 11; and supplying the first composition 11 formed as a byproduct to the chemical reactor 30.

More specifically the methodology of the present invention and which is utilized for producing hydrogen includes a step of providing a supply of sodium hydroxide 11; providing a source of methane 40; providing a chemical reactor 30 and supplying the sodium hydroxide 11, and methane 40 to the chemical reactor 30, and chemically reacting the sodium hydroxide 11 and the methane 40 to produce sodium hydride 80 and other byproducts; providing a burner 70 and supplying, at least in part, the byproducts produced as a result of the chemical reaction of the sodium hydroxide 11 and the methane 40, to the burner, and wherein the burner 70 when supplied with the byproducts produces heat energy 72 which is supplied to the chemical reactor 30 to increase the temperature of the sodium hydroxide 11 and the methane 40. The present methodology further includes the steps of providing a container 13 defining a cavity 21; providing a supply of water 90 to the cavity 21 of the container 13; increasing the pressure of the water 90 within the cavity of the container to a high pressure; supplying the sodium hydride 80 to the cavity 21 of the container 13 and reacting the sodium hydride 80 with the water 90 to produce high pressure hydrogen gas 110, and a byproduct which includes sodium hydroxide 11. The methodology further includes the steps of withdrawing the high pressure hydrogen gas 110 from the cavity 21; and supplying the sodium hydroxide 11 which is a byproduct of the chemical reaction of the sodium hydride 80, and the water 90, to the chemical reactor 30 for use in the further production of additional sodium hydride 80.

Therefore, it will be seen that the present invention provides many advantages over the prior art devices and methods and which have been utilized heretofore to produce chemical hydrides which are useful in the production of hydrogen gas at remote locations.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of producing hydrogen, comprising:
   providing a first composition;
   providing a second composition;
   reacting the first and second compositions together to produce a chemical hydride;
   providing a liquid and reacting the chemical hydride with the liquid in a manner to produce a high pressure hydrogen gas and a byproduct which includes the first composition; and
   reusing the first composition formed as a byproduct in a subsequent chemical reaction to form additional chemical hydride.

2. A method as claimed in claim 1, and wherein the method further comprises:
   providing a chemical reactor, and wherein the step of providing a first composition comprises providing sodium hydroxide to the chemical reactor.

3. A method as claimed in claim 2, and wherein the step of providing a second composition further comprises providing a hydrocarbon to the chemical reactor, and wherein the sodium hydroxide and the hydrocarbon chemically react to produce the chemical hydride.

4. A method as claimed in claim 3, and wherein the hydrocarbon further comprises methane.

5. A method as claimed in claim 1, and wherein the step of chemically reacting the first and second compositions produces hydrogen and other byproducts, and wherein the method further comprises:
   providing a burner; and
   supplying at least a portion of the byproducts produced by the chemical reaction of the first and second compositions to the burner to be consumed in the burner and which produces heat energy; and
   supplying the heat energy produced by the burner to increase the temperature of the first and second compositions.

6. A method as claimed in claim 5, and wherein one of the byproducts produced by the chemical reaction of the first and second compositions includes carbon monoxide, and wherein the method further comprises providing a shift converter; and supplying the byproducts including the carbon monoxide to the shift converter where the carbon monoxide is converted to carbon dioxide.

7. A method as claimed in claim 1, and further comprising:
   providing a container defining a cavity;
   supplying the liquid to the cavity of the container;
   increasing the pressure of the liquid within the container to a high pressure; and
   supplying the chemical hydride to the cavity of the container to chemically react with the liquid which is under high pressure to produce the high pressure hydrogen gas and the byproduct which includes the first composition.

8. A method as claimed in claim 1, and further comprising:
   utilizing the high pressure hydrogen gas to produce a work output.

9. A method as claimed in claim 1, and further comprising:
   providing an expansion engine and coupling the expansion engine in fluid flowing relation relative to the high pressure hydrogen gas, and wherein the expansion engine produces a hydrogen gas output having a reduced temperature and pressure and which further generates a power output;
   coupling the expansion engine in fluid flowing relation relative to a refrigeration assembly, and wherein the hydrogen gas output having the reduced temperature and pressure is provided to the refrigeration assembly; and
   energizing the refrigeration assembly, at least in part, by supplying the power output generated by the expansion engine to the refrigeration assembly to further reduce the temperature of the hydrogen gas output to liquefy the hydrogen gas.

10. A method of producing hydrogen, comprising:
    providing a chemical reactor;
    selecting a first composition having chemical bonds and which is capable of forming a chemical hydride and supplying the first composition to the chemical reactor;
    selecting a second composition and which provides a source of hydrogen and supplying the second composition to the chemical reactor;
    reacting the first and second compositions in the chemical reactor to produce a chemical hydride;
    providing a container which encloses a liquid under pressure and supplying the chemical hydride to the container;
    reacting the chemical hydride with the liquid which is under pressure in the container to produce high pressure hydrogen gas and byproducts which include the first composition; and
    supplying the first composition formed as a byproduct to the chemical reactor.

11. A method as claimed in claim 10, and wherein the step of chemically reacting the first and second compositions to produce the chemical hydride produces additional byproducts, and wherein the method further comprises:
  providing a burner; and
  supplying at least a portion of the additional byproducts produced by the chemical reaction of the first and second compositions to produce the chemical hydride to be combusted in the burner and which produces heat energy; and
  supplying the heat energy produced by the burner to the chemical reactor to increase the temperature of the first and second compositions.

12. A method as claimed in claim 11, and wherein the step of selecting the second composition comprises selecting a hydrocarbon, and wherein one of the byproducts produced by the chemical reaction of the first and second compositions to produce the chemical hydride comprises carbon monoxide, and wherein the method further comprises:
  providing a shift converter and supplying the byproducts which include the carbon monoxide to the shift converter; and chemically converting, at least in part, the carbon monoxide to carbon dioxide within the shift converter.

13. A method as claimed in claim 10, and wherein the first composition comprises, at least in part, sodium hydroxide, and wherein the second composition comprises, at least in part, methane, and wherein the chemical hydride produced by the reaction of the sodium hydroxide and the methane produces a sodium hydride.

14. A method as claimed in claim 13, and wherein the liquid which chemically reacts with the sodium hydride is water, and wherein the water is consumed in the chemical reaction, and wherein the method further comprises:
  providing a supply of water and metering the supply of water to the container as the water is consumed in the chemical reaction.

15. A method as claimed in claim 10, and further comprising:
  storing the high pressure hydrogen gas in storage container for use in remote locations.

16. A method as claimed in claim 10 and further comprising:
  providing an expansion engine; and
  liquefying the high pressure hydrogen gas by supplying the high pressure hydrogen gas to the expansion engine which cools the high pressure gas.

17. A method as claimed in claim 16, and wherein the expansion engine provides an electrical power output when supplied with the high pressure hydrogen gas, and wherein the method further comprises:
  providing a refrigeration assembly which has an electrical power demand;
  supplying the electrical power output of the expansion engine to meet, at least in part, the electrical power demand of the refrigeration assembly; and
  supplying the hydrogen gas which has been cooled by the expansion engine to the refrigeration assembly, and wherein the refrigeration assembly further cools the hydrogen gas to a temperature where the hydrogen gas liquefies.

18. A method as claimed in claim 17, and wherein the electrical power output of the expansion engine supplies a preponderance of the electrical power demand of the refrigeration assembly.

19. A method of producing hydrogen, comprising:
  providing a supply of sodium hydroxide;
  providing a source of methane;
  providing a chemical reactor and supplying the sodium hydroxide and methane to the chemical reactor, and chemically reacting the sodium hydroxide and the methane to produce sodium hydride and other byproducts;
  providing a burner and supplying, at least in part, the byproducts produced as a result of the chemical reaction of the sodium hydroxide and the methane, to the burner, and wherein the burner when supplied with the byproducts produces heat energy which is supplied to the chemical reactor to increase the temperature of the sodium hydroxide and the methane;
  providing a container defining a cavity;
  providing a supply of water to the cavity of the container;
  increasing the pressure of the water within the cavity of the container to a high pressure;
  supplying the sodium hydride to the cavity of the container and reacting the sodium hydride with the water which is under pressure to produce high pressure hydrogen gas, and a byproduct which includes sodium hydroxide;
  withdrawing the high pressure hydrogen gas from the cavity; and
  supplying the sodium hydroxide produced as a byproduct of the chemical reaction of the sodium hydride and the water to the chemical reactor for use in the further production of additional sodium hydride.

20. A method as claimed in claim 19, and further comprising:
  providing an expansion engine and coupling the expansion engine in fluid flowing relation relative to the cavity of the container, and wherein the expansion engine produces a hydrogen gas output having a reduced temperature and pressure and which further generates an electrical power output;
  coupling the expansion engine in fluid flowing relation relative to a refrigeration assembly, and wherein the hydrogen gas output having the reduced temperature and pressure is provided to the refrigeration assembly; and
  energizing the refrigeration assembly, at least in part, by supplying the electrical power output generated by the expansion engine to the refrigeration assembly to further reduce the temperature of the hydrogen gas output to liquefy the hydrogen.

21. A method of providing hydrogen, comprising:
  providing a source of sodium hydroxide;
  providing a source of methane;
  reacting the sodium hydroxide and methane under conditions so as to produce sodium, carbon monoxide, and hydrogen;
  providing a shift converter which receives the sodium, carbon monoxide and hydrogen and which converts the carbon monoxide to carbon dioxide;
  providing a burner which is positioned downstream of the shift converter, and supplying the carbon dioxide to the burner to be consumed, and wherein the sodium and hydrogen react to form sodium hydride;
  providing a source of a liquid and reacting the sodium hydride with the liquid to produce hydrogen gas and a byproduct which includes sodium hydroxide; and
  reusing the sodium hydroxide in a subsequent chemical reaction to form additional sodium hydride.

* * * * *